US006781969B2

(12) United States Patent
Nikides et al.

(10) Patent No.: US 6,781,969 B2
(45) Date of Patent: Aug. 24, 2004

(54) PREEMPTIVE POWER-UP METHOD FOR PROTECTING SYSTEM USERS FROM SUDDEN HIGH SPEED DATA

(75) Inventors: Robert S. Nikides, Carol Stream, IL (US); John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 798 days.

(21) Appl. No.: 09/779,793

(22) Filed: Feb. 8, 2001

(65) Prior Publication Data

US 2002/0105923 A1 Aug. 8, 2002

(51) Int. Cl.[7] .............................................. H04B 7/185
(52) U.S. Cl. ..................... 370/318; 370/311; 455/13.4; 455/63.1; 455/67.13
(58) Field of Search ................................ 370/318, 437, 370/252, 329, 341, 332, 333, 310, 311; 455/13.4, 67.13, 63.1, 452.2, 509, 69

(56) References Cited

U.S. PATENT DOCUMENTS 6,449,461 B1 * 9/2002 Otten .......................... 455/63.1
6,711,380 B1 * 3/2004 Callaway, Jr. ............. 455/41.2

* cited by examiner

Primary Examiner—Ajit Patel
Assistant Examiner—Steven A Blount (57) ABSTRACT

A method is provided for preemptively protecting mobile units within a wireless communication system from interference caused by sudden high speed data transmission within the system. The method includes detecting an imminent high speed data transmission in at least one particular cell of the system. At least each current local mobile unit is identified that is in signal communication with a base station of the at least one particular cell. A current operating level for at least each of the current local mobile units is determined. A necessary increase in the current operating level is estimated for at least each of the current local mobile units. A transmit time is predicted for when the imminent high speed data transmission will occur. The current operating level for at least each of the current local mobile units is increased by the corresponding necessary operating level increase at a time no later than the predicted transmit time.

19 Claims, 4 Drawing Sheets

PREEMPTIVE POWER-UP METHOD FOR PROTECTING SYSTEM USERS FROM SUDDEN HIGH SPEED DATA

FIELD OF THE INVENTION

The present invention relates generally to wireless communication systems, and more particularly to a method of preemptively increasing voice and data user's power to protect them against sudden high speed data transmission.

BACKGROUND OF THE INVENTION

Communications systems are known to employ power control methods that control transmission energy of the base station and remote mobile units. A number of different communications systems employ power control, one of which is a Code Division Multiple Access (CDMA) system operating according to Telecommunications Industry Association Interim Standard 95B (IS 95B) protocol. Others include newer generation CDMA 2000 and Universal Mobile Telecommunications System (UMTS) protocols. Power control is used to maintain sufficient communication link quality and information throughput while using minimum power levels in order to maximize system capacity. Reverse-link (mobile or remote unit to base site) power control varies the power level of reverse communication links used by a mobile unit to transmit information to a base site. Forward-link (base site to mobile or remote unit) power control varies the power level of forward communication links used by a base site to transmit information to mobile stations or units.

A CDMA system has a plurality of individual cells or sectors each typically providing a number of dedicated or fundamental channels to transmit low energy and low bit rate voice and data signals. A newer generation of this type of system is designed to also provide a plurality of available supplemental channels adapted for transmitting high speed data signals within the same cells overlying the voice and low speed data signals within the same system infrastructure. One such system is known as wideband CDMA or CDMA 2000. These communication systems utilize an approach in transmitting signals where voice and data signals can be simultaneously transmitted over the air on the same carrier.

Forward link power control for older generation communication systems, such as a CDMA system, is slower than reverse link power control. Power control for newer generation systems, such as UMTS and CDMA 2000, utilizes faster power control on both forward and reverse links. Older CDMA systems typically use forward link quality information feedback transmitted on reverse links to update forward link power levels. This feedback information can be in the form of bits used to indicate whether an individual forward link traffic channel frame was erased. This information can also be in the form of a transmitted message used to indicate that some number of forward link frames were erased during a given time span. Reverse link power control for the older CDMA systems uses a method whereby a power control group is transmitted from the mobile communication unit and received by the base station. The base station compares the energy of the power control group to a set point threshold and instructs the mobile communication unit on a forward link to power up or power down as necessary by transmitting a power adjustment command to the mobile or remote unit. Newer generation systems use power control groups in this manner transmitted between the base station and the mobile unit on both the forward and reverse links. Power control in this manner is used to achieve a desired signal link quality on both the forward and reverse links.

Under normal conditions, this type of closed loop power control will result in sufficient power levels that maintain an interference or noise level of the receive signal at a substantially fixed and acceptable level. However, a call initiated by a remote high speed data (HSD) user within a given sector or cell causes interference that can deteriorate signal quality for other users including both voice and data calls occurring within the cell and neighboring cells. These other users typically operate at minimum power levels necessary to achieve the targeted signal link quality. The new HSD user transmits at a significantly higher power level creating higher levels of system interference. The sudden increase in interference from the high speed data transmission causes erasures for users in this cell and neighboring cells until their power level can be sufficiently increased, which can take on the order of several seconds. This time delay can result in unacceptable lost voice and/or data information for the affected users.

This problem occurs in older IS 95B systems and in newer generation CDMA systems. In a newer generation CDMA system, the sudden HSD transmission occurs over one or more supplemental channels and interferes with existing voice and data users on the fundamental channels and interferes with other data users on supplemental channels in the cell and neighboring cells. In such a system, the high speed supplemental channels are time multiplexed between multiple users. Hence, the channel will typically not always be completely full or completely idle upon the offered load. The channel can have duty cycles in the millisecond range, thus creating the potential for multiple frame erasures per second. This increased frequency of erasures is what contributes significantly to the loss of signal quality or degradation in call quality.

Voice calls or voice data transmissions typically operate at lower transmission speeds, for example, about 9 or about 14.4 Kilobits per second (kbps), and operate at the lowest power necessary to achieve sufficient voice quality. A sudden high speed data transmission by a new HSD user results in interference that can overwhelm the power control algorithms of voice and other existing calls in the particular cell. Therefore, the existing calls must increase their power level multiple times through an algorithm in order to compensate for the new interference caused by one or more HSD calls. During the time the voice calls, for example, are increasing power levels to compensate for the increased level of interference, the frame erasure rate (FER) will rise significantly above voice call target FER values.

The length of time required for the voice calls within a particular cell to increase their power is significant. In one example, a voice call transmits in frames each having a particular time length, such as 20 milliseconds (ms) per frame. For a communication system such as an older generation IS-95B format or newer CDMA 2000 format, a voice call requires at least 12 frames or 240 ms before a second power sense measurement message (PSMM) is sent by the mobile unit indicating that it is receiving erasures. For example, it has been shown that at least one third of voice calls in a particular sector or cell will require at least two power "bump up" messages after each HSD download in that sector in IS-95B systems. Therefore, these mobile units will experience unacceptable FER for at least 240 ms.

Consequently, there is a need for a method to preemptively power up existing voice calls or voice users, as well as other existing users, within a communication system to protect the existing transmissions from the HSD high speed, high power download.

DETAILED DESCRIPTION OF THE PREFERRED EMBODIMENTS

The present invention provides a method that addresses the above-mentioned problems by preemptively increasing the power level for users within one or more cells or sectors of a wireless communication system from increased interference levels caused by a sudden high speed data transmission in a particular cell. The method generally involves identifying at least each of the current local users in signal communication with the particular base station of the system and determining their current operating or power levels. The method also involves detecting a high speed data transmission in the particular cell. The method includes estimating a necessary operating level increase for at least each of the identified current local users. The method includes predicting a transmit time when the imminent high speed data transmission will occur in the particular cell and then increasing the current operating level of at least each of the identified current local users by the estimated necessary operating level increase no later than at the predicted time.

The power control method of the invention can be implemented both on forward link or reverse link communications. The method can further include identifying any neighboring cells where a soft hand-off or signal transfer (in a CDMA system) is taking place between the base station of the particular cell and the identified neighboring cell or cells. The method can also include powering up both the current local users in the particular cell as well as each current other user in the neighboring cells. The method is applicable for virtually any existing communication traffic in the identified cells, including current voice users as well as any existing data users.

Throughout this description, the term "fundamental channel" is used as an identifier for traffic channels supporting voice users. The term "supplemental channel" is used as an identifier for traffic channels supporting data and other non-voice users. These terms have been commonly used in this manner in many communication technologies. However, there are some communication systems that utilize different terminology and different architecture. Future systems may also utilize different architecture and terminology to designate dedicated or shared channels and the like as well. For example, some systems identify control traffic channels and bearer traffic channels within a system. A control channel is used by the system to transmit and receive system commands. Bearer channels are for other traffic including voice, data, high speed data and the like. A UMTS system typically has one dedicated traffic channel and multiple bearer channels, one each dedicated to voice, to data, and to high speed data calls. The present description is not intended to limit power control over only fundamental and supplemental channels, but is intended to be useful for any communication system regardless of traffic channel architecture or designation. The terms "fundamental" and "supplemental" are merely used herein as known terminology to simplify describing aspects of the disclosed example of the invention.

Figure 1:
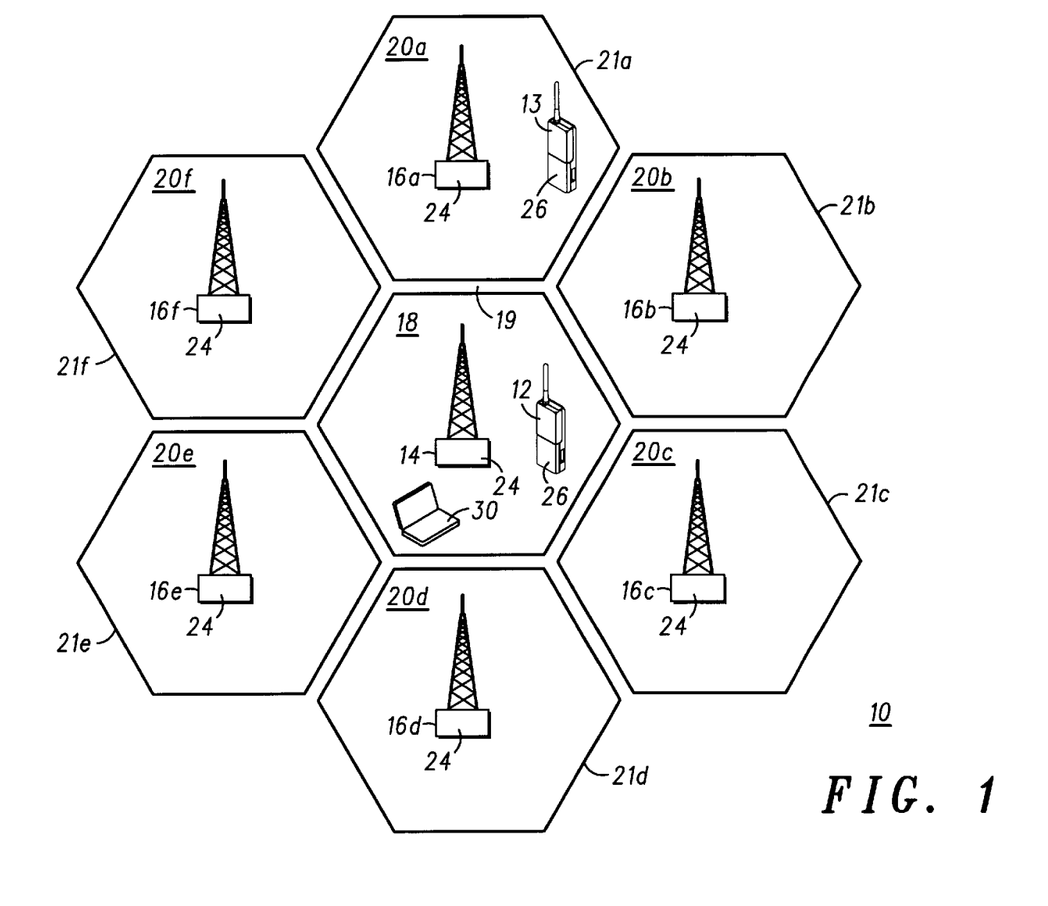
FIG. 1 is a block diagram of a typical wireless communication system suitable for use in accordance with the teachings of the present invention.

Referring now to the drawings, FIG. 1 illustrates a block diagram of a typical wireless communication system constructed according to the teachings of the present invention and for which the method of the invention is particularly well suited. The communication system 10 has mobile users or units 12 and 13, a first base transceiver station (BTS) 14, and a plurality of surrounding or neighboring base transceiver stations (NBTS) 16a–16f. As generally depicted in FIG. 1, one or more mobile units 12 resides at a given time in one cell or sector 18 of the system 10 defined by a boundary range or area 19 that is served by the BTS 14. Each of the NBTS 16a–16f serves a separate respective cell 20a–20f adjacent the cell 18 that are defined by respective boundaries 21a–21f. A centralized base station controller (CBSC) (not shown) is in communication with the BTS 14 and the several NBTS 16 of the communication system. Such a system also typically has one or more other units 13 residing in the neighboring cells 20a–20f.

The system 10 will typically have a large number of mobile users or units 12 and 13 and a plurality of BTSs spread over an area served by the overall system as is known in the art. For convenience of illustration, FIG. 1 only shows two mobile units 12 and 13 and a relatively small number of BTSs including the BTS 14 and the several NBTS 16. Also as in known in the art, the mobile user or units 12 and 13 can represent cellular telephones that can travel with a system user throughout the various cells of the system. The mobile units 12 and 13 can also represent other types of data devices such as a wireless data terminal or phone, video phone, or the like. These types of units transmit data and/or voice signals over the several BTSs of the communication system.

The type of communication system 10 as represented in FIG. 1 can vary within the scope of the present invention. The system can control power on the forward links or can control power on the reverse links, and the manner in which it does so is dependent on the system technology. In one example, the system 10 can be an older generation CDMA system or an Interim Standard 95B (IS-95B) system utilizing forward power control that uses forward link quality information feedback transmitted on reverse links to update forward link power levels. These older generation systems control power differently on the forward and the reverse links as noted above. The system 10 can also be a newer CDMA 2000 system controlling power in the same manner on the forward and the reverse links also as noted above. In one further example, the CDMA system can be a third generation (3G) cellular CDMA 2000 system or other such newer generation communication system. Generally, the system 10 represents any communication system that transmits signaling messages and requires accurate transmission and receipt of signals regardless of system load.

The BTS 14 and the several NBTS 16 each include a transceiver 24 that has a transmitter and a receiver. The transceiver 24 transmits over-the-air (OTA) radio frequency (RF) signals to be received by the mobile units 12 and 13.

This type of transmission is well known in the art and will not be described in any greater detail herein. Transceivers 24 receive messages from the mobile unit 12, also by means well known in the art.

Each mobile unit 12 and 13, has a transceiver 26 including a transmitter and receiver. The mobile units 12 and 13 communicate with a BTS by transmitting messages via the transceiver 26 on reverse links, and receives messages via the transceiver 26 that are generated by the BTS on forward links. In one embodiment of the invention, the BTS 14 and NBTS 16 act as their own power control manager in the system 10. Alternatively, the CBSC can be adapted to manage power control for the entire system 10.

Also illustrated in FIG. 1 is a third mobile high speed data user or unit 30 that is a wireless data terminal, whether a telephone or another device, capable of transmitting high speed data (HSD) in contrast to merely transmitting voice signals or low speed data over the communication system. The mobile unit 30 transmits, whether by upload or download, HSD over the communication system. Such data transmission requires relatively high power consumption and is sent at very high data rates or speeds. A sudden transmission by the new HSD unit 30 can cause interference and FER for both existing data and voice users.

Voice transmissions can tolerate some small amount of error. Tolerable FER for voice transmissions is typically on the order of 1% to 3%. HSD is typically highly compressed when sent so that each frame contains a large amount of data, and thus, HSD can tolerate only very low FER. However, data traffic is often sent over an algorithm such as a Radio Link Protocol (RLP) IS-707 for a CDMA 2000 system or over a Radio Link Control (RLC) for a UMTS. Such algorithms are in the category of Automatic Repeat Request (ARQ) algorithms. An ARQ algorithm retransmits frames or blocks that were received in error over the radio link, providing a virtually error free link to the HSD application. The tolerable FER for such data is therefore in the range of 1% to about 20%, and typically between about 5% and 10%. There are data streaming services that essentially can only tolerate only very low FER, and therefore the present invention is very well suited for such applications.

In the present invention, if the mobile unit 12 is transmitting and receiving signals in the cell 18 served by the BTS 14, the mobile unit 12 requires a minimum power level to satisfactorily operate. The necessary power level depends on a number of variables. Generally, if a small number of users are presently transmitting, the required power level for each is relatively low, although each must at least operate at a minimum required power level. If a larger number of users are transmitting at a given time, each of the mobiles will be operating at a higher power level to overcome the interference generated by the multiple users. The same general principles apply to both voice and data users operating in the same cell.

Voice units operate on dedicated fundamental channels, as defined herein, typically at a lower data rate and a lower power level than an HSD user does in CDMA communication systems. In a system such as a 3G CDMA 2000 system, one or more additional supplemental channels, also as defined herein, are provided for transmitting and receiving higher power, higher speed data rate signals. The method described herein is directed to powering up the current users to overcome the interference created when the HSD mobile unit 30 either begins to transmit or receive signals on at least one supplemental channel in the cell 18. The current users are the one or more mobile units currently transmitting or receiving signals in the same cell (units 12) or neighboring cells (units 13).

In older generation IS-95B protocol systems, multiple supplemental channels, up to 7 per data call, can be assigned or utilized. In current CDMA 2000 protocol systems, up to 2 supplemental channels can be assigned or utilized. Newer technologies may eventually modulate a composite set of supplemental channels according to a modulation scheme. As noted above, some systems may utilize shared resource channels, each dedicated to particular types of users. The invention is not intended to be limited to a particular communication system or protocol, nor to a particular channel or signal allocation scheme.

Figure 2A:
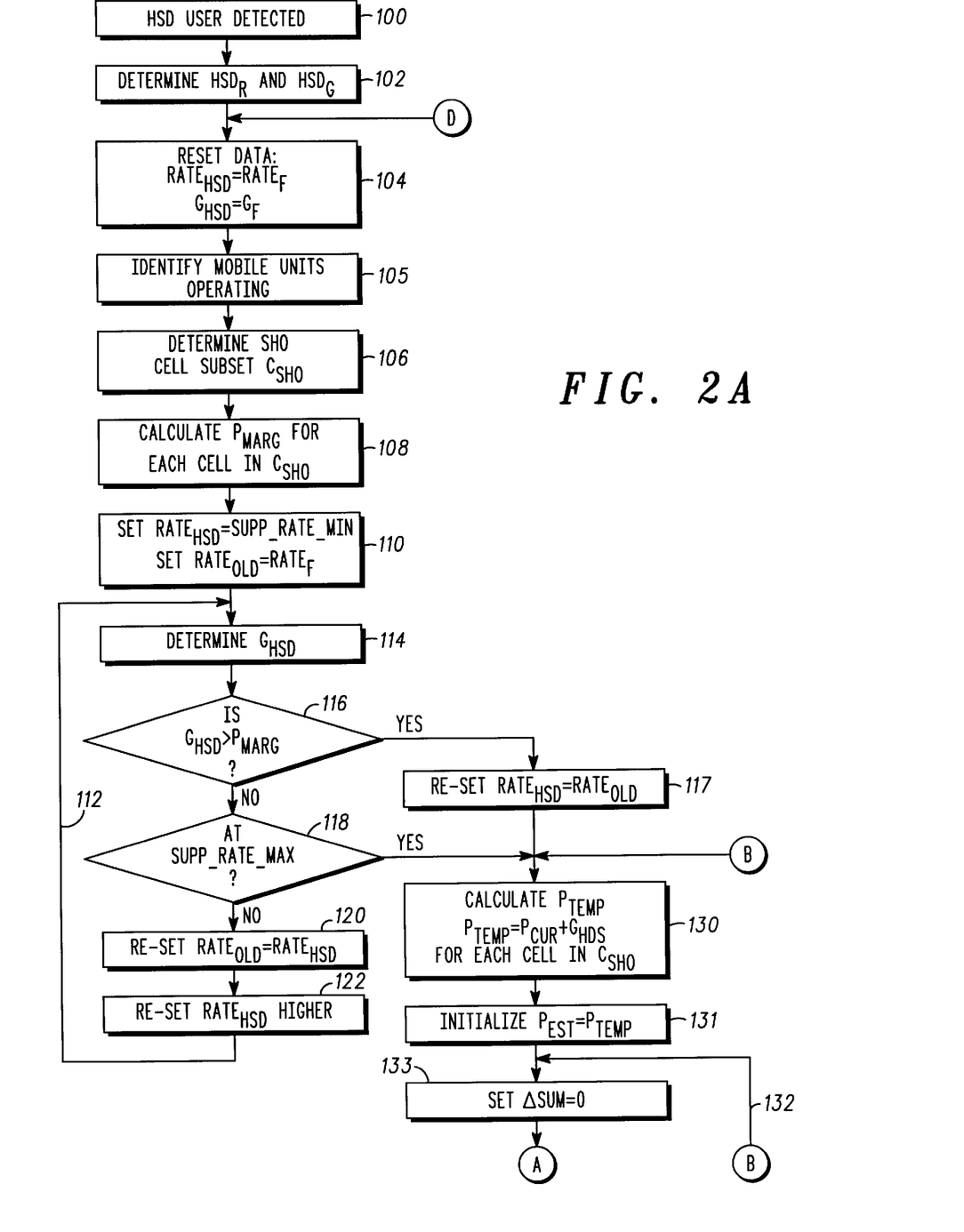
FIG. 2 is a flow diagram of a process according to one example of the present invention for preemptively increasing power to voice users and other users in a cell when a high speed data user is about to transmit data signals in the cell.
Figure 2B:
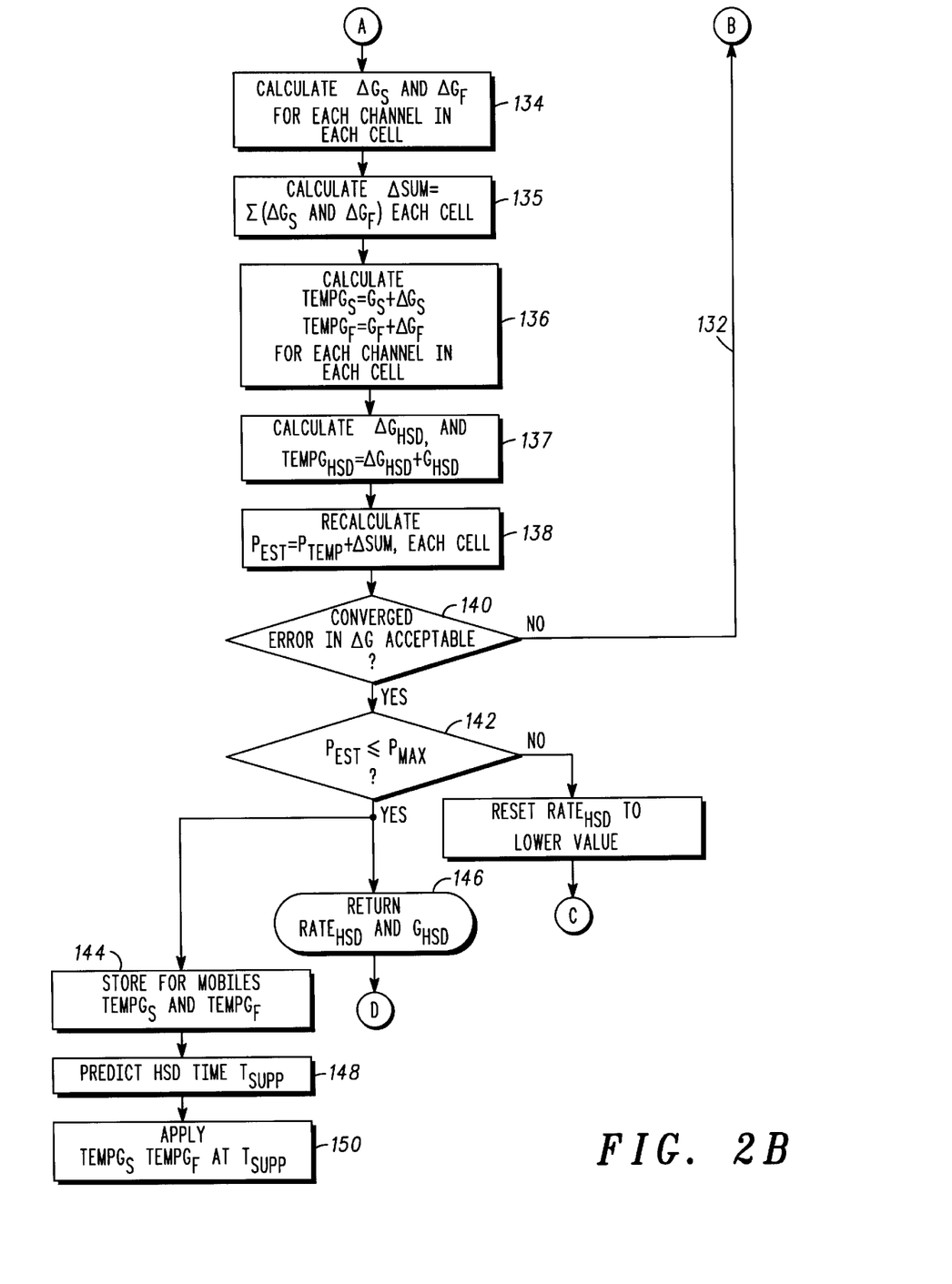

FIG. 2 illustrates a flow diagram of one example of a method according to the teachings of the invention for preemptively powering up the mobile unit or units 12 to reduce or eliminate error rates caused by sudden interference from an HSD transmission. In the present example, a mobile user 30 is detected and about to send or download HSD signals (reverse link) to the base station or BTS 14. The method described herein is equally suitable where the system detects HSD signals waiting for upload to the unit 30 (forward link). Further, the flow diagram in FIG. 2 represents a power control method carried out on forward link communications. The method described herein can also be carried out on reverse link communications in essentially the same manner. Any differences are described below where appropriate.

Also by way of example, the flow diagram of FIG. 2 assumes that the communication system 10 is a newer generation CDMA 2000 system that utilizes both fundamental and supplemental channels. However, as noted above, the disclosed example can be readily adapted by those having ordinary skill in the art for other older and newer generation systems using different signal and/or channel allocations, architecture, nomenclature, and the like.

At step 100, HSD signals are required to be sent over a supplemental channel either in the reverse direction from the user 30 to the base station (BTS 14) within the cell 18, or in the forward direction from the base stations in the soft hand-off to the user 30. Once the HSD transmission request has been detected, the data is queued for an available supplemental channel or link. The power control manager of the system 10 (whether the particular BTS 14 or the CBSC) recognizes that HSD information is queued to be sent and begins the exemplary power control method according to FIG. 2 at step 102. First, the power control manager determines the imminent supplemental channel data transmission rate ($HSD_r$) and supplemental channel operating level gain ($HSD_g$) for the appropriate forward or reverse direction. For this forward link power management example, $HSD_g$ represents the power level gain or the transmitted power at soft hand-off cells for the supplemental channels to the unit 30. If this were a reverse link power control management system, the $HSD_g$ value would represent the expected noise contribution or transmitted power received at the base station from the unit 30.

As described below, the requested gain $HSD_g$ and rate $HSD_r$ may not be the same as the actual gain and rate once download begins. The actual values will be determined according to the teachings of the invention by current cell usage load and maximum cell capabilities. The power gain $HSD_g$ in this example represents the power required for the HSD transmission relative to the pilot power of the BTS 14. The data rate $HSD_r$ represents the number of bits per unit of time (i.e. Kilobits per second or Kbps) that the data will be transmitted.

Next, algorithm values or registers are initialized or reset from a previous run of the method for the fundamental and supplemental channels of the cell 18 at step 104. The actual supplemental channel data transmission rate (RATEHSD) for the HSD unit 30 in this example is initially set to a control value equivalent to the lowest data transmission rate capability of the supplemental channel. As an example, in a CDMA 2000 system this control value can be equivalent to the fundamental channel data rate (RATE$_f$) of the identified units 12 for the particular cell 18. The actual supplemental channel gain (GHSD) in this example is also initially set to a control value equivalent to the lowest channel gain capability of the supplemental channel. In a CDMA 2000 system this control value can be the fundamental channel gain (G$_f$) for the identified units 12 within the particular cell 18. Again, for a reverse link power control management system, the value GHSD would represent the actual noise rise or interference contribution expected at the base station caused by the HSD transmission.

These actual transmission values for RATEHSD and GHSD are set to the minimum capabilities for the supplemental channel under the current usage for the cell 18. These minimum supplemental channel initial values can and will likely vary from the exemplary fundamental channel values noted above for a CDMA 2000 system, depending upon the technology used. The initial control values can also vary depending upon the supplemental channel data rate capability in a given system. The values may also vary for different HSD resources or equipment, which may have different power requirements. The initial values may need to be scaled up accordingly.

Next, the power control manager identifies each present user currently being served by the BTS 14 in the particular cell 18 at step 105. This can include units 12 both located in cell 18 as well as units 13 located in other cells 20 but in communication with the BTS 14 of the cell 18.

Next, as indicated at step 106, the communication system can identify, if desired, each neighboring cell 20 wherein a NBTS 16 is also in signal communication with one or more of the identified mobile units 12. This can include units 12 located in cell 18 in communication with the BTS 14 and a NBTS 16a, for example, as well as units 13 located in a neighboring cell 20b, for example, in communication with the NBTS 16b and the BTS 14. In a 3G CDMA or CDMA 2000 system, when nearing the boundary region between neighboring cells, such as cells 18 and 20a as shown in FIG. 1, a mobile station or unit 12 transitions from communicating with one BTS 14 to communicating with both the BTS 14 and the NBTS 16a simultaneously. This is so that communication is not interrupted and that speech quality is not degraded, even temporarily. This multiple link communication is currently referred to in the communications industry as a soft hand-off (SHO).

For the method of the invention, a cell subset (C$_{sho}$) is then determined. The cell subset includes the particular cell 18 and each of the neighboring cells 20a–20f identified as being in simultaneous communication with one or more of the identified units or present users 12 and 13. C$_{sho}$ is equivalent to (C$_0$ ... C$_n$), where C$_0$ represents the particular cell 18 in which the HSD unit 30 is about to download, and the value n represents the number of neighboring cells, and C$_i$ is the i$_{th}$ neighboring cell in the subset C$_{sho}$.

Once the cell subset is determined, power level availability must be calculated for the appropriate communication link of this example. A maximum power operating level margin (P$_{marg}$) is determined for each of the cells in the subset C$_{sho}$ as indicated at step 108. In this forward link power management example, each value P$_{marg}$ represents the maximum power level available for each cell in the subset. The maximum power level margin P$_{marg}$ is calculated by subtracting the current power level usage (P$_{cur}$) in the particular cell 18 from the maximum available cell power (P$_{max}$) for that particular cell, or P$_{marg}$=P$_{max}$-P$_{cur}$. In this calculation, P$_{cur}$ is a summation of all power usage for the fundamental, overhead, control, and active supplemental channels during the projected HSD transmission. P$_{max}$ is the minimum or lower of either the limits of the cell linear power amplifier or the cell interference maximum capacity. Cell interference maximum capacity is derived from the pilot channel power. For example, in an IS2000 IX carrier system, this is typically 5 or 6 times the pilot power. This maximum power margin P$_{marg}$ will determine the maximum power-up limit for the method of the invention in a given application.

For a reverse link management system, the above values will represent somewhat different variables, but the calculation would be essentially the same. P$_{max}$ would represent the received interference threshold or maximum capacity. P$_{cur}$ would represent the total mobile unit transmit power or interference level received at the base station. P$_{marg}$ would represent the difference between the maximum and the current levels. The values G$_f$ and G$_s$ would represent each current mobile unit's contribution to the received interference or power P$_{cur}$ at the particular base station.

Next, as shown at step 110, a starting value representing the actual HSD transmission rate RATEHSD for the imminent HSD download is reset to a minimum initial value, which in the present example is the minimum supplemental channel data rate capability (SUPP_RATE_MIN) of the technology. For example, in an IS2000 or a CDMA 2000 communication system, the SUPP_RATE_MIN is typically the fundamental channel data rate multiplied by $2^i$ (RATE$_f$*$2^i$), where i can be a number from 1 to N. The value N in a CDMA 2000 system represents a maximum possible multiple of the fundamental channel data rate resulting in the maximum supplemental channel data transmission rate (SUPP_RATE_MAX). Also as shown for step 110, a reference or control value for the download rate of the current mobile units 12 and 13 (RATE$_{old}$) is initially set equivalent to the first or previously set value of the RATEHSD, which in this example was the fundamental channel data rate or RATE$_f$.

A number of data rates are supported in the standard for a CDMA 2000 system and a subset of these rates are typically implemented. Different radio configurations RC3, RC4, and RC5, for example, are implemented in a CDMA 2000 system and the value of N can be different for the forward and reverse link in each configuration. As an example, one configuration may have a supplemental channel data rate of 153 Kbps and another configuration may have a data rate of as high as 2 Megabits per second (Mbps). Other technologies will have supplemental channel data rates that are different functions of the fundamental channel rates or other system variables for the technology. Therefore, different CDMA 2000 systems and also other technologies may each have different initial or minimum supplemental channel rate or SUPP_RATE_MIN values.

For example, in a CDMA 2000 system, if i is equal to 1 and the RATE$_f$ is 9,600 kbps, the SUPP_RATE_MIN for the system will be 19.2 kbps. The RATEHSD would initially be set to this value. Similarly, if i is equal to 4 for this particular system configuration, the SUPP_RATE_MIN value will be 153.6 kbps and the RATEHSD will initially be set to this value. As noted above, other examples are certainly possible for different CDMA configurations and for other technologies where the SUPP_RATE_MIN values vary from this example.

The method then enters a first iterative loop shown generally at step 112 in FIG. 2. The iteration 112 generally calculates the highest possible transmission rate for the HSD unit 30 based on the maximum available power margins $P_{marg}$ in each cell of the subset $C_{sho}$. The iteration 112 determines a power level or gain GHSD for a given data rate RATEHSD and compares it to the calculated maximum available power level $P_{marg}$ for each of the cells in the subset $C_{sho}$. If the calculated gain exceeds the maximum margin $P_{marg}$, the current RATE$_{old}$ value is selected so as to select a rate that does not require a gain value that exceeds $P_{marg}$. This current RATE$_{old}$ value is either the rate that was calculated from the preceding iteration of the loop 112, or is the initially set transmission rate, RATE$_f$ in this example, if on the first loop iteration.

First, the supplemental gain GHSD (initially set to equal $G_f$ at step 104) is recalculated as a function of a number of values affecting transmission rates and power levels at step 114. For example, the GHSD for a given cell in the subset can be determined as a function of the following variables (for a forward link power control management system):

$$G_{HSD} = f(Ec/Io_{cells}, G_f, SHO\_STATE, P_{cur}, RATE_{HSD}, Delay\_spread)$$

where, SHO_STATE represents the current SHO status for each presently identified unit 12 relative to each cell, wherein SHO will affect power levels. $P_{cur}$ represents, in this forward link example, the current power level for the cell as discussed above. RATEHSD represents the current set value (initially reset to equal SUPP_RATE_MIN at step 110) for the download rate at which data will be transmitted on the supplemental channel in the cell 18. Delay_Spread represents time delay information between signal components bouncing off different objects in the cell which can also affect power levels. Less power is required if more signal components are recoverable and more power is required if fewer components are recoverable. $Ec/Io_{cells}$ represents the pilot signal unique to each cell that will have an effect on power levels and will assess the signal quality of the link. For a reverse link power control system, this variable would be $Ec/Io_{mobiles}$ for systems which utilize a pilot channel in the reverse direction. Eb/Nt or other suitable recovered energy metric can be substituted in systems which do not employ a reverse link pilot from the mobile to the base station. The parameters and variables used to recalculate GHSD are technology dependent and are a function of the Air-Interface standard for the particular technology.

As indicated at step 116, if the recalculated gain GHSD is greater than the available power margin $P_{marg}$, then the power gain GHSD required for the current value of RATEHSD is too high. Regardless of whether this result is reached on the first iteration of the loop 112 or on a second or subsequent iteration, the next step 117 is to reset the RATEHSD equal to the current download rate reference value RATE$_{old}$. On the first iteration, RATE$_{old}$ is equivalent to the initial set point, which in this example is the fundamental channel data rate RATE$_f$. If the loop 112 has been reiterated, the last reset value of RATE$_{old}$ is used for the value RATEHSD. From step 117, the method continues at step 130 under these circumstances. The result is that the data download RATEHSD used at step 130 is the maximum value that does not require exceeding the available power capacity of the cell. Step 130 is described below.

If, however, the recalculated GHSD from step 114 is not yet greater than the maximum power margin $P_{marg}$, then the next step 118 is to compare the currently calculated actual HSD download RATEHSD to a maximum supplemental channel rate comparison value (SUPP_RATE_MAX). The SUPP_RATE_MAX value for this comparison is the lower of either the supplemental channel maximum transmission rate capability for the technology or is the requested download rate HSD$_r$ discussed above. If the current calculated RATEHSD is at the SUPP_RATE_MAX value, the actual transmission rate is not stepped up any further and the method then continues again at step 130 described in greater detail below.

However, if the current calculated RATEHSD is not yet at the comparison SUPP_RATE_MAX value, the next step 120 is to reset the reference value RATE$_{old}$ equal to the current RATEHSD value. The next step 122 is to reset or step up the calculated actual HSD download RATEHSD to a next higher data rate. For example, in an IS2000 type system, the current calculated supplemental channel data rate can be doubled (RATEHSD*2) or a set of multiple supplemental channels can be concatenated or linked in series. The degree that the calculated RATEHSD value is stepped up is again technology dependent and will vary according to the system requirements. Once the RATEHSD has been stepped up to a higher value, the iterative loop 112 is run again, beginning at step 114 to again recalculate GHSD, compare the new GHSD value to the maximum available power margin $P_{marg}$, and reiterate the steps of loop 112 as necessary.

The loop 112 will take only a few fractions of a second to perform each time and can be reiterated a number of times. Upon reaching either a condition where the calculated actual supplemental channel gain GHSD exceeds the maximum available power margin $P_{marg}$ at step 116 or a condition where the current RATEHSD value is at SUPP_RATE_MAX (either the system supplemental channel maximum capability or the requested download rate HSD$_r$), the method then continues at step 130. Until reaching one of these conditions, the first iterative loop 112 continues. As before, if the power control manager utilizes a reverse link method, the operating level or gain values within the loop 112 represent the calculated, maximum, or actual noise or interference levels at the base station instead of mobile unit power levels.

The next part of the method generally shown at iteration or loop 129 is to determine the temporary power level increase or bump up for each cell of the cell subset $C_{sho}$ that is needed for the presently identified mobile units 12 and 13 within the cell subset $C_{sho}$ and for the queued HSD unit 30. At step 130, a first estimate of the temporary cell power level ($P_{temp}$) for each cell of the subset is calculated by adding the current power level $P_{cur}$ and the calculated or estimated supplemental channel gain GHSD for each cell of the cell subset $C_{sho}$, or $P_{temp}=(P_{cur}+G_{HSD})$ for each cell i of the subset.

At step 131, a control value ($P_{est}$) or estimated power level for each cell is initially set to equal the initial calculated value $P_{temp}$, or $P_{est}=P_{temp}$ for each cell. This step is to initialize the value $P_{est}$ for each iteration of the macro loop 129, when necessary.

The next step 132 as generally identified in FIG. 2 is to perform a micro loop or iteration within the loop 129 to incrementally and very quickly determine the actual amount of power up or gain increase for each of the identified units 12 and 13 as well as the HSD unit 30. This iteration 132 takes into account the estimated power increases or gains for each supplemental and fundamental channel in use as well as the queued supplemental channel for the HSD unit 30.

The first step 133 is to initialize a sum total channel gain for each cell ▲SUM=0, where ▲SUM represents a summation of the estimated channel gain ▲$G_f$ and ▲$G_s$ for each fundamental and supplemental channel currently in use within a particular cell i. The next step 134 is to calculate and temporarily store the estimated or projected power level or gain increase ▲$G_f$ or ▲$G_s$ for each of the identified mobile units 12 and 13 on identified fundamental channels in use (voice users) as well as supplemental channels in use (data users). This is accomplished by calculating a separate ▲$G_f$ or ▲$G_s$ value for each channel in use for each cell of the subset as a function of both the estimated supplemental channel gain GHSD for the HSD unit 30 (generated at loop 112) and the initial power up value $P_{temp}$ for the particular cell (generated at step 130).

For a reverse link power managed system, the values ▲$G_f$ and ▲$G_s$ represent the change in received power at the base station from each unit in use. The values $P_{temp}$ and $P_{est}$ represent again will represent a temporary expected interference value or received power at the base station.

The next step 135 is to then calculate the sum total ▲SUM for the estimated channel gain for each active channel within each cell. This step is represented as ▲SUM=3(▲$G_f$+▲$G_s$) for each cell i of the subset.

The next step 136 is to calculate and temporarily store an estimated channel gain value for each active supplemental channel (TEMP$G_s$) and fundamental channel (TEMP$G_f$) within each cell i of the subset. These values are calculated by adding the actual or current gain values for each supplemental channel ($G_s$) and fundamental channel ($G_f$) that is active and the corresponding estimated gain value ▲$G_f$ or ▲$G_s$ for the particular channel, or TEMP$G_s$=$G_s$+▲$G_s$, and TEMP$G_f$=$G_f$+▲$G_f$. As noted above, the terms "fundamental" and "supplemental" are used herein to simplify the description of the method and are not intended to limit the scope of the invention to only systems having supplemental and fundamental channels. Systems having control or bearer channels or other types of channel allocations and designations are equally well suited to the method of the invention.

The next step 137 is to calculate and temporarily store the estimated gain increase ▲GHSD for the imminent HSD unit 30 supplemental channel allocation. Both the new HSD unit and the identified present users will be bumped up in power because, once the power level for the units 12 and 13 is increased, the power for HSD unit 30 should account for these increases and therefore should also be increased to avoid suffering interference from the gains of the existing fundamental and supplemental channel users. The value of ▲GHSD is determined as a function of $P_{temp}$ and ▲SUM for each cell. Therefore, a new value for the HSD unit 30 power increase TEMPGHSD is also calculated, where TEMPGHSD=▲GHSD+GHSD, and where GHSD was initially estimated at step 114 within the first loop 112.

The next step 138 is to recalculate and temporarily store an updated temporary projected power increase $P_{est}$ for each cell of the subset. This is calculated by summing the $P_{temp}$ value for each cell and the sum of the total gain increases ▲$G_s$ and ▲$G_f$ for each cell in the subset $C_{sho}$, or $P_{est}$=$P_{temp}$+▲SUM for each cell i in $C_{sho}$.

The next step 140 is to compare the power gain estimates ▲G for both the existing fundamental and supplemental channels and for the imminent supplemental channel high speed allocation to the last estimated power level $P_{est}$ in each cell of the subset $C_{sho}$ prior to adding the gains. Each iteration of the loop 132 will result in a smaller and smaller incremental change in power level. If the change between the estimated amount for this loop 132 iteration and the previous iteration is smaller than a predetermined acceptable convergence error, the loop is stopped and the method continues at step 142. The convergence error can be any selected value, such as, for example, 1 dB or some other minimum increment that is detectable by the power control manager of the system. If the convergence error at step 140 is not yet deemed acceptable, the loop 132 returns to step 133 and continues until the convergence error in gain estimates is deemed acceptable.

In order to prevent the loop from executing too many times and thus taking up too much time, a built-in maximum counter can be included to automatically stop the loop 132 and continue the method at step 142. Otherwise, the loop could conceivably take too long to repeatedly run the calculations. This could preempt the HSD download or initiate the download before power up is completed.

Once the gain estimate convergence error is deemed acceptable, the next step 142 is to compare the current estimated cell power level for each cell Pest to the maximum cell power capability $P_{max}$. If the estimated cell power $P_{est}$ is at or below the maximum cell power $P_{max}$, the power up estimate loop 132 for the particular cell is complete and the program method will continue at step 144. At this step, the TEMP$G_s$, TEMP$G_f$, and TEMPGHSD values calculated from the power up or convergence loop 132 are stored for each mobile unit 12 and 13 and the HSD unit 30. The initial values for supplemental channel rate RATEHSD and supplemental channel gain GHSD can be reset simultaneously as indicated at step 146 and then applied at step 104.

From step 144, the method continues at step 148 and determines the time $t_{supp}$ when the HSD unit 30 will begin downloading data over the new supplemental channel allocation at TEMPGHSD and RATEHSD. At step 150, the method sets the power levels for each unit 12 and 13 at the stored values TEMP$G_s$ and TEMP$G_f$ from step 144 at the time $t_{supp}$ for a download on a forward link. If the method were for a reverse link upload and a technology the utilizes small fixed power increment sizes, as in IS2000, the time delay to accomplish the power level change would require that the system would begin to adjust each mobile's transmit power at least one frame prior to the time $t_{supp}$. This is to avoid a period of interference while power up is effected over the reverse link.

If, however, at step 142, the estimated cell power Pest exceeds the maximum cell power $P_{max}$ the method continues at step 152, instead of step 144. At step 152, the transmission rate value RATEHSD is reset to the next lowest data rate to achieve a higher necessary power level increase to overcome the anticipated interference from the imminent HSD unit 30. For example, for an IS2000 or a CDMA2000 system as before, the data rate value can be reset by dividing the supplemental channel rate by 2, or RATEHSD=RATEHSD/2, or, alternatively, by choosing a lower order modulation, coding, or number of supplemental channels. As will be evident to those of ordinary skill in the art, the reset value can depend on the particular technology used for the system and the capabilities and characteristics of that system.

Following block 152, the program method then returns to block 130 and reiterates the macro loop 129 and power gain estimate micro loop 132 until reaching an appropriate data rate and power level to effectively avoid interference from the imminent HSD download. The loop 132 will terminate and move through the remaining method sequence of steps 144 to 150 either when the convergence error is deemed acceptable or when a set counter limit is reached as described above.

By utilizing the method of the invention as described in the exemplary flow diagram of FIG. 2, the amount of power up necessary for each of the mobile units 12 in the cell 18 and units 13 in one or more of the appropriate neighboring cells 20 will be accomplished simultaneous to HSD unit 30 beginning data transmission. Hence, interference with voice and data calls of the units 12 is avoided. As is known to those having ordinary skill in the art, simply increasing power for all mobile users 12 and 13 within these cells without paying attention to the amount of power increase can cause added interference for all of the mobile units. Indiscriminately increasing power can have the affect of defeating the purpose of powering up these users to avoid interference transmission loss caused by the HSD user 30. The present invention powers up the users 12 quickly and precisely by estimating the necessary power level increase and executing the power up at or immediately prior to the time $t_{supp}$ when the HSD transmission begins.

Figure 3:
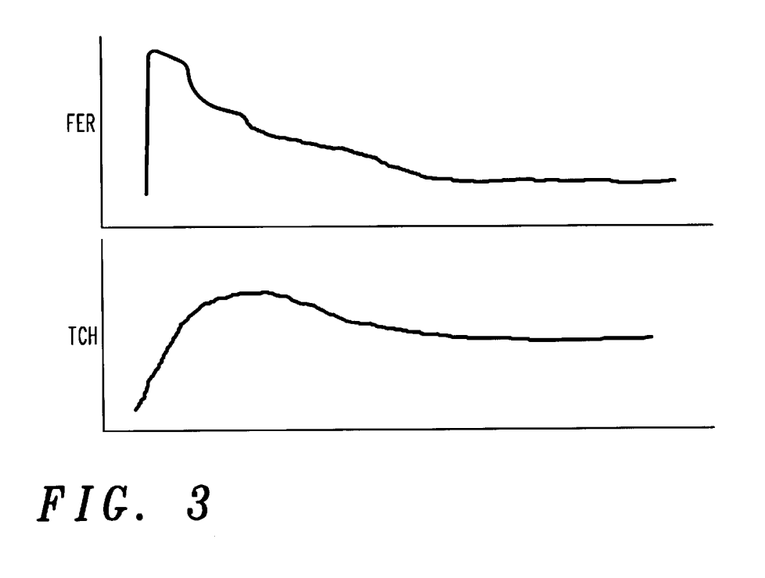
FIG. 3 is a graphic illustration of a comparison between forward link traffic channel power level and frame erasure rate without using the method of the invention.
Figure 4:
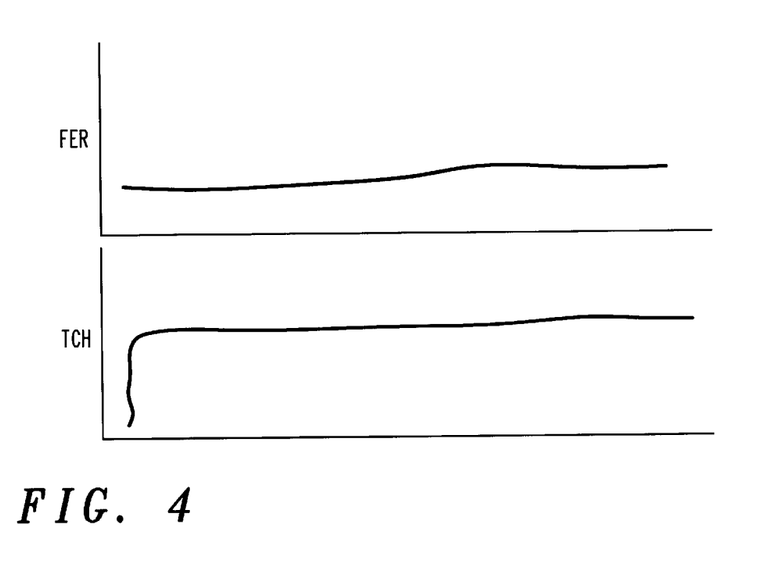
FIG. 4 is a graphic illustration of a comparison between forward link traffic channel power level and frame erasure rate while utilizing the method of the invention.

FIGS. 3 and 4 compare traffic channel power and frame erasure rates (FER) both when not utilizing the method of the invention (FIG. 3) and when utilizing the invention (FIG. 4). As illustrated in FIG. 3, the slow standard power up algorithm of voice and/or data users 12 and 13 after detection of the HSD unit 30 and initiation of data download results in immediate and sustained unacceptable interference until the appropriate power level for these units is achieved. As shown in FIG. 4, the FER remains fairly steady and constant when utilizing the method of the invention such as the example illustrated in FIG. 2. As the traffic channel power levels for the units 12 are immediately powered up at the time of HSD download by the data user 30, no spike in FER results. The major benefit of this invention is to avoid transmission loss for a period of time or complete loss of a call for one or more of the units 12 when the HSD user 30 begins to transmit data. As shown in FIG. 4, the data burst by the HSD user 30 therefore has virtually no affect on identified present mobile units 12, whether voice users or data users, within the particular cell 18 when utilizing the method of the invention.

The foregoing detailed description has been given for clearness of understanding only and no unnecessary limitations should be understood therefrom, as modifications would be obvious of those of ordinary skill in the art.

What is claimed is:

1. A method for preemptively protecting users within a wireless communication system from high speed data transmission interference within the system, the method comprising the steps of:
    detecting an imminent high speed data transmission in at least one particular cell of the system;
    identifying at least each current local mobile unit in signal communication with a base station of the at least one particular cell;
    determining a current operating level for at least each of the current local mobile units;
    estimating a necessary increase in the current operating level for at least each of the current local mobile units;
    predicting a transmit time when the imminent high speed data transmission will occur; and
    increasing the current operating level for at least each of the current local mobile units by the corresponding necessary increase at a time no later than the predicted transmit time.

2. A method according to claim 1, wherein the step of identifying further comprises:
    also identifying current other mobile units located in neighboring cells that are in signal communication with the base station of the at least one particular cell.

3. A method according to claim 2, wherein the steps of determining and estimating each further comprise:
    determining a current operating level for each of the current other mobile units; and
    estimating a necessary increase in the current operating level for each of the current other mobile units.

4. A method according to claim 1, wherein the step of detecting further comprises:
    recognizing high speed data that is queued for transmission over a channel of the communication system.

5. A method according to claim 4, wherein the step of detecting further comprises:
    detecting both a requested operating level gain and a requested data transmission rate of the queued high speed data.

6. A method according to claim 1, wherein the steps of identifying and determining each further comprise:
    monitoring channel allocation and usage within the communication system.

7. A method according to claim 1, further comprising the step of:
    implementing the step of increasing during a forward link transmission from the base station of the at least one particular cell to each of the current local mobile units.

8. A method according to claim 7, wherein the steps of determining and estimating each further comprise:
    determining a current operating power level for at least each of the current local mobile units; and
    estimating a necessary power level increase for at least each of the current local mobile units.

9. A method according to claim 8, further comprising the steps of:
    also identifying current other mobile units located in neighboring cells that are in signal communication with the base station of the at least one particular cell;
    also determining a current operating power level for each of the current other mobile units; and
    also estimating a necessary increase in the current operating power level for each of the current other mobile units.

10. A method according to claim 1, further comprising the step of:
    implementing the step of increasing during a reverse link transmission from at least each of the current local mobile units to the base station of the at least one particular cell.

11. A method according to claim 10, wherein the steps of determining and estimating each further comprise:
    determining a current operating interference level at the base station of the at least one particular cell resulting from at least each of the current local mobile units; and
    estimating a necessary operating interference increase for at least each of the current local mobile units.

12. A method according to claim 11, further comprising the steps of:
    also identifying current other mobile units located in neighboring cells that are in signal communication with the base station of the at least one particular cell;
    determining a current operating interference level for each of the current other mobile units; and
    estimating a necessary increase in the current operating interference level for each of the current other mobile units.

13. A method according to claim 1, wherein the step of identifying further comprises:

identifying current voice users of the system and identifying current data users of the system, wherein each of the identified voice and data users is one of the current local mobile units.

14. A method according to claim 13, wherein the step of identifying further comprises:

also identifying current other voice users and current other data users located in neighboring cells that are in signal communication with the base station of the at least one particular cell.

15. A method according to claim 1, further comprising the steps of:

calculating an available operating level margin for at least the base station of the at least one particular cell including accounting for the necessary operating level increase for at least each of the current local mobile units; and assuring that an aggregate sum of the necessary operating level increases at the transmit time does not exceed the available operating level margin for the base station of the at least one particular cell.

16. A method according to claim 15, further comprising the steps of:

identifying a cell subset including the at least one particular cell and any neighboring cells in soft hand-off with at least one of the current local mobile units;

further identifying any current other mobile units in the neighboring cells that are in signal communication with a base station of at least one of the neighboring cells;

performing the steps of determining and estimating for each of the current other mobile units;

calculating an available operating level margin for each base station of the cell subset including accounting for the necessary increase for each of the current local mobile units and current other mobile units in signal communication with a respective base station; and assuring that an aggregate sum of the necessary operating level increases for respective ones of the current local and other mobile units at the transmit time does not exceed the available operating level margin for each base station of the cell subset.

17. A method according to claim 1, further comprising the step of:

placing at least each current local mobile unit in an accelerated operating level control mode for a period of time beginning no later than at the transmit time.

18. A method according to claim 1, wherein the step of estimating further comprises:

maximizing a transmission rate for the imminent high speed data transmission based upon an available operating level margin within the at least one particular cell.

19. A method according to claim 18, wherein the step of estimating further comprises:

estimating the necessary operating level increase for at least each of the current local mobile units utilizing the maximized transmission rate and comparing an aggregate sum of the estimated operating level increases to the available operating level margin for the at least one particular cell.

* * * * *